(12) United States Patent
Schetters et al.

(10) Patent No.: US 6,483,725 B2
(45) Date of Patent: Nov. 19, 2002

(54) DC/DC CONVERSION CIRCUIT HAVING A SWITCHING FREQUENCY PROPORTIONAL TO POWER OUTPUT

(75) Inventors: Cornelis Johannes Adrianus Schetters, Eindhoven (NL); Johannus Emmanuel Maria Lammers, Eindhoven (NL); Tijmen Cornelis Van Bodegraven, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/773,416

(22) Filed: Feb. 1, 2001

(65) Prior Publication Data

US 2001/0022733 A1 Sep. 20, 2001

(30) Foreign Application Priority Data

Feb. 4, 2000 (EP) .............................. 00200380

(51) Int. Cl.[7] .............................................. H02M 3/335
(52) U.S. Cl. ...................................................... 363/19
(58) Field of Search ........................ 363/19, 18, 21.02, 363/21.03, 21.07, 21.08, 21.15, 21.16

(56) References Cited

U.S. PATENT DOCUMENTS

| | | | |
|---|---|---|---|
| 4,652,984 A | | 3/1987 | van der Akker et al. ..... 363/18 |
| 5,424,933 A | * | 6/1995 | Illingworth .................. 363/97 |
| 5,668,704 A | * | 9/1997 | Higuchi ....................... 363/19 |
| 5,675,479 A | | 10/1997 | Tani et al. ..................... 363/19 |
| 5,838,556 A | * | 11/1998 | Yokoyama .................... 363/19 |

FOREIGN PATENT DOCUMENTS

EP 0883231 A2 12/1998

* cited by examiner

*Primary Examiner*—Shawn Riley
(74) *Attorney, Agent, or Firm*—Steven R. Biren

(57) ABSTRACT

DC/DC conversion circuit (1), includes a transformer (2) having a primary winding (3), a secondary winding (4), and an auxiliary winding (5); a switching transistor (T), including a series circuit with the primary winding (3) between first and second direct current input terminals (6; 7); a start circuit (R1, C1) connected to a control electrode of the switching transistor (T) for switching the switching transistor (T) on by powering the direct current input terminals (6; 7); a control transistor connected to the control electrode of the switching transistor (T) for switching off the switching transistor (T) in dependence on a current flowing through the series circuit during operation. The auxiliary winding (5) and the control transistor (Q) connect to a voltage control circuit (8) for setting an output power provided at the secondary winding (4) of the transformer (2) during operation by a controlled switching-on of the switching transistor (T) in dependence on the magnitude of a current flowing in the primary winding (3). The conversion circuit (1) is arranged such that during operation via the auxiliary winding (5) a voltage required at the control electrode of the switching transistor (T) for on thereof is built up in a time period which is inversely proportional to the amount of output power provided at the secondary winding (4).

7 Claims, 3 Drawing Sheets

DC/DC CONVERSION CIRCUIT HAVING A SWITCHING FREQUENCY PROPORTIONAL TO POWER OUTPUT

BACKGROUND OF THE INVENTION

The invention relates to a DC/DC conversion circuit comprising a transformer with a primary winding, a secondary winding, and an auxiliary winding; a switching transistor which forms a series circuit with the primary winding between first and second DC voltage input connection terminals; a start circuit which is connected to a control electrode of the switching transistor for switching on the latter when the DC voltage input connection terminals are powered; a control transistor connected to the control electrode of the switching transistor for switching off the switching transistor in dependence on a current flowing in said series circuit during operation; and a voltage control circuit connected to the auxiliary winding and the control transistor for controlling an output power supplied at the secondary winding of the transformer during operation through switching-on of the switching transistor in a controlled manner in dependence on the value of a current flowing in the primary winding.

A conversion circuit of this kind, also referred to as switch mode power supply or self-oscillating power supply (SOPS) in the literature, is known per se from U.S. Pat. No. 5,675,479.

It is known that the switching losses in the switching transistor, which is usually a transistor of the field effect type, for example a metal oxide semiconductor transistor (MOST), increase quadratically with the voltage across the main conduction path of the switching transistor. This is the drain-source voltage in the case of a MOST. A reduction of the drain-source voltage at the moment of switching-on of the switching transistor accordingly has a major influence on the reduction of the switching losses.

It is also known that the frequency with which the switching transistor is switched in a SOPS increases as the output power at the secondary side of the transformer decreases, and will be theoretically infinite for an output power equal to zero. Since the switching losses of a MOST increase linearly with the switching frequency, however, thermal problems may arise in the switching transistor at lower output powers. In particular, the idle or standby power of the circuit is comparatively high, which is undesirable, for example for reasons of economy.

To avoid thermal overloading of the switching transistor, a suppression circuit is used in the conversion circuit proposed by the cited U.S. Pat. No. 5,675,479 for reducing the oscillation frequency when the generated output power is low. The suppression circuit is switched off when the output power is high.

The switching-on and -off of the suppression circuit gives rise to a jump in the oscillation frequency in this known conversion circuit. This renders an accurate control of the output power supplied at the secondary side of the transformer more difficult because the switching-on and -off of the suppression circuit is subject to a certain hysteresis.

SUMMARY OF THE INVENTION

The invention accordingly has for its object to improve a DC/DC conversion circuit of the kind mentioned in the opening paragraph such that, at comparatively low output powers, i.e. low as compared with the nominal power which can be supplied by the conversion circuit, the switching frequency of the switching transistor is also low and varies gradually with the output power given off.

According to the invention, this object is achieved in that the conversion circuit is designed such that during operation a voltage required for switching the switching transistor on is built up on the control electrode thereof in a time period whose length is inversely proportional to the value of the output power supplied to the secondary winding.

After the switching transistor has been switched on through the start circuit, a current will flow from the input connection terminals through the series circuit of the switching transistor and the primary winding of the transformer. This current will have a rising gradient because energy is built up in the transformer. When the current reaches a preset peak value, the control transistor is energized, which transistor is connected such that the voltage at the control electrode of the switching transistor is reduced, so that the switching transistor switches itself off. The energy stored in the transformer is now given off to a load connected to the secondary side of the transformer. Subsequently, a self-oscillatory effect arises at the primary side of the transformer under the influence of capacitive and inductive action, whereby an AC voltage is induced in the auxiliary winding. This voltage is coupled to the control electrode of the switching transistor through the voltage control circuit.

The conversion circuit according to the invention utilizes the effect that the induction voltage in the auxiliary winding for a higher output power at the secondary side of the transformer is higher than for a lower output power. The voltage at the control electrode for switching-on of the switching transistor can accordingly be built up more quickly in the case of a comparatively high output power than in the case of a lower output power. As a result, the switching transistor will be switched with a comparatively lower switching frequency in the case of lower output powers than in the case of higher output powers of the conversion circuit. It will be obvious that the switching frequency is made gradually dependent on the output load in a comparatively simple manner, i.e. in that the switching frequency is reduced when the output load is reduced, whereby the switching losses in the switching transistor are limited.

A jump in the switching frequency is effectively avoided by the solution according to the invention. The output power of the circuit, i.e. the output voltage, can still be well controlled also for comparatively low output powers thanks to the absence of hysteresis effects.

In a preferred embodiment of the conversion circuit according to the invention, the control electrode of the switching transistor is capacitively loaded by means of at least one element with a capacitive action such that the voltage required for switching-on of the switching transistor is built up in said element during operation.

This embodiment of the conversion circuit according to the invention is characterized by the simplicity of its circuit technology, i.e. the circuit can be realized essentially with only a few discrete components without complicated integrated control circuits or the like.

It was found that the switching transistor switches on at or adjacent a first minimum in the voltage across the main conduction path of the switching transistor, i.e. the drain-source voltage in the case of a MOST, given a suitable dimensioning of the voltage control circuit and the capacitive load on the control electrode of the switching transistor, the gate in the case of a MOST.

At comparatively high output powers, i.e. at a comparatively high voltage induced in the auxiliary winding, this will be the first minimum in the voltage across the main conduction path of the switching transistor. If the output load is comparatively low, however, it will take some time before the voltage at the control electrode is sufficiently high for switching the switching transistor on again, owing to the capacitive load on the control electrode of the switching transistor and the lower induction voltage in the auxiliary winding. The switching transistor will then switch on, for example, at the second, third, or subsequent minimum in the voltage across the main conduction path.

Switching-on of the switching transistor when the voltage across it shows a minimum, i.e. is in a trough, also contributes to a limitation of the switching losses.

In a practical embodiment of the conversion circuit according to the invention, said at least one element with capacitive action is formed by a capacitor which is connected to the control electrode of the switching transistor and which forms part of the start circuit, a coupling capacitor by which the voltage control circuit is connected to the control electrode of the switching transistor, and the inherent gate-source capacitance of the switching transistor itself. The exact values of the various components obviously depend on the properties of the switching transistor and the conversion circuit themselves and may be determined in a comparatively simple manner by those skilled in the art.

In a yet further embodiment of the conversion circuit according to the invention, the output voltage at the secondary side of the transformer may be readily adjusted in that the voltage control circuit comprises a rectifier circuit connected in parallel with the auxiliary winding for applying a bias voltage to the control transistor during operation. The moment at which the control transistor switches off the switching transistor can be dynamically varied in dependence on the value of the bias voltage, and so can the value of the output voltage generated in the secondary winding as a result.

In a still further embodiment of the conversion circuit according to the invention, provision is made for an optical coupling circuit coupled to the control transistor and the rectifier circuit for influencing the bias voltage applied to the switching transistor during operation. The output voltage can thus be adjusted via the optical coupling circuit (referred to as "optocoupler" in the literature), with electrical separation from, for example, the secondary winding of the transformer.

BRIEF DESCRIPTION OF THE DRAWING

The invention will be explained in more detail below with reference to the accompanying drawing, in which.

DESCRIPTION OF THE PREFERRED EMBODIMENTS

Figure 1:
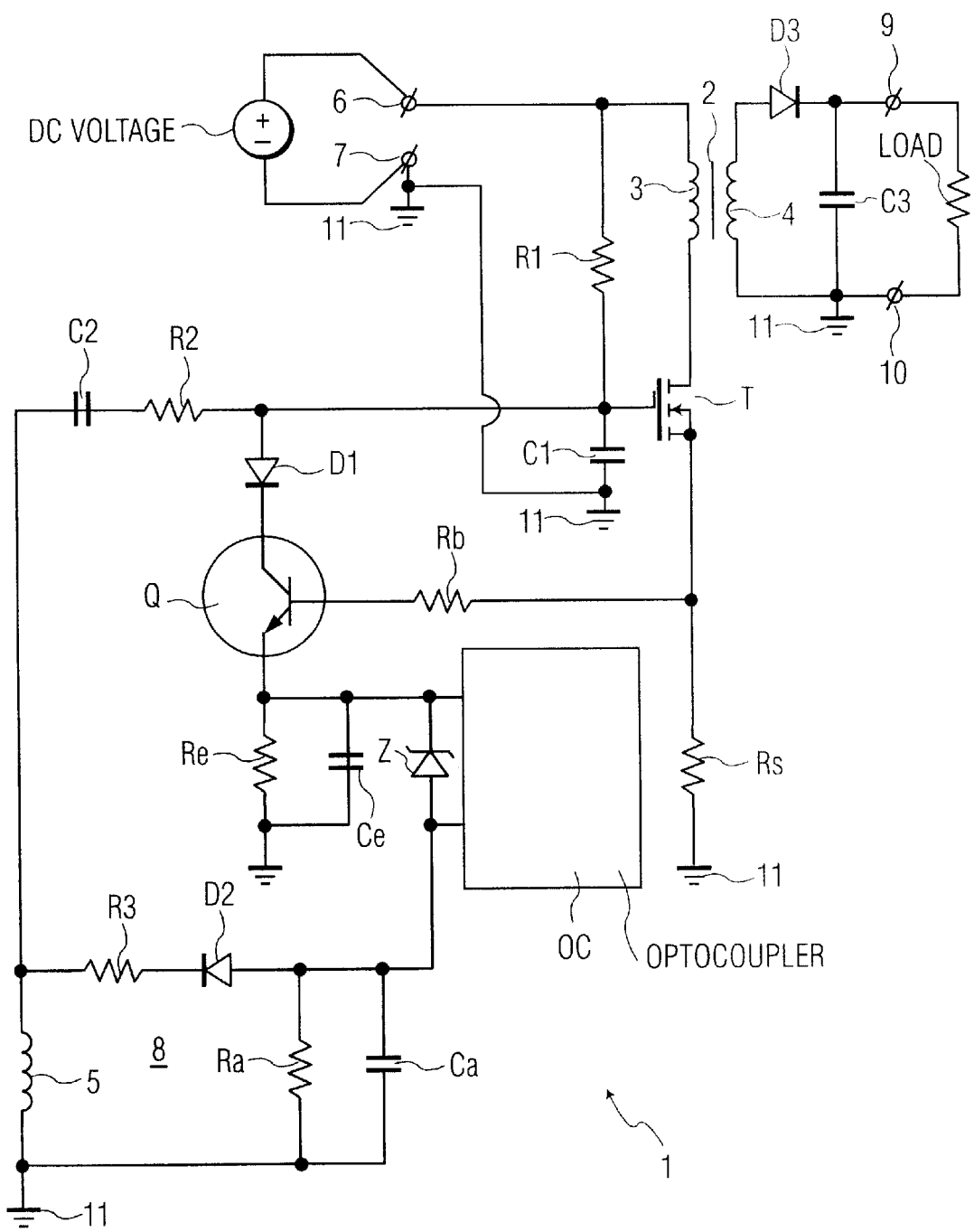
FIG. 1 is a simplified circuit diagram of the DC/DC conversion circuit according to the invention.

FIG. 1 shows a DC/DC conversion circuit according to the invention with the general reference numeral 1. In its simplest embodiment, the conversion circuit 1 comprises a transformer 2 with a primary winding 3, a secondary winding 4, and an auxiliary winding 5. The auxiliary winding 5 is shown as though separate from the transformer 2 for the purpose of the drawing only. In actual fact, the auxiliary winding 5 forms part of the transformer 2 and is wound in opposite sense to the primary winding 3 and connected to signal ground 11.

A switching transistor T, a "metal oxide semiconductor transistor" (MOST) in the present embodiment, has its main conduction path connected in series with the primary winding 3 of the transformer 2, between a first, positive DC input connection terminal 6 and a second, negative DC input connection terminal 7 which is connected to the signal ground 11 of the conversion circuit 1. In the embodiment shown, the drain of the switching transistor T is connected to one end of the primary winding 3, while a current sensing resistor Rs is connected between the source and the second DC input connection terminal 7 or signal ground 11.

The gate of the switching transistor T is connected via a resistor R1 to the first DC input connection terminal 6, and to signal ground 11 via a capacitor C1. The resistor R1 and the capacitor C1 form a start circuit for switching the transistor T on when the DC input connection terminals 6 and 7 are powered with a DC voltage.

The conversion circuit 1 further comprises a control transistor Q, of the NPN type in the embodiment shown, whose base is connected via a resistor Rb to the junction point of the resistor Rs and the source of the switching transistor T. The collector of the control transistor Q is connected to the gate of the switching transistor T via a diode D1. The diode D1 is forward biased with respect to the collector current of the control transistor Q so as to prevent a possible collector current in the control transistor Q in the case of a negative voltage on the gate of the switching transistor T. The emitter of the control transistor Q is connected to the signal ground 11 of the conversion circuit 1 via a parallel circuit of a resistor Re and a capacitor Ce.

A voltage control circuit 8 is coupled to the gate of the switching transistor T via a series arrangement of a resistor R2 and a capacitor C2. The voltage control circuit 8 comprises a rectifier chain consisting of a resistor Ra and a capacitor Ca connected in parallel, which parallel arrangement is connected in series with a diode D2 and a resistor R3 across the auxiliary winding 5. The auxiliary winding 5 is wound and connected such that a negative voltage with respect to the signal ground is built up in the capacitor Ca via the diode D2 during operation. The capacitor Ca is connected to the emitter of the control transistor Q via a zener diode Z and an optical coupling member OC (optocoupler) whose output connection terminals are connected in parallel to said zener diode. The zener diode Z is connected in reverse to the voltage across the capacitor Ca.

The secondary winding 4 of the transformer 2 is connected in series with a rectifier diode D3 between DC output connection terminals 9 and 10 of the conversion circuit 1. A smoothing capacitor C3 is present parallel to the DC output connection terminals 9 and 10.

The operation of the conversion circuit 1 will now be illustrated with reference to the graphs shown in FIGS. 2 to 7. These graphs represent idealized waveforms and serve for illustration only, so that no specific voltage and current values or time indications can be derived therefrom.

Figure 2:
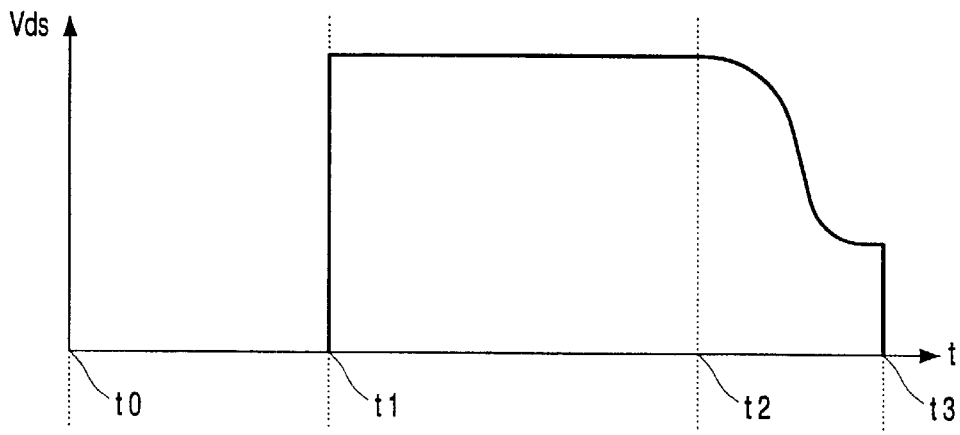
FIGS. 2 to 7 are graphs, at various scales, for elucidating the operation of the conversion circuit shown in FIG. 1.

FIG. 2 graphically depicts the gradient of the voltage across the main conduction path of the switching transistor T, i.e. the voltage Vds across the drain and source in the embodiment shown, as a function of time t.

Figure 3:
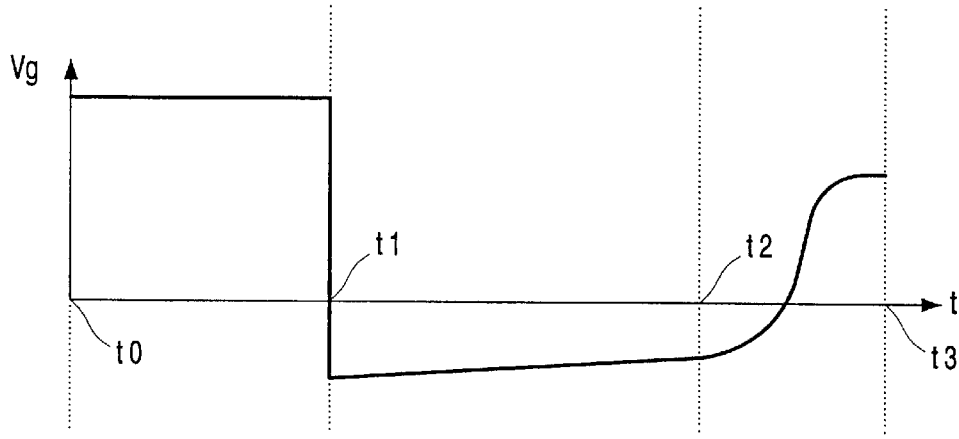

FIG. 3 graphically depicts the control voltage at the control electrode of the switching transistor T, the voltage Vg at the gate in the embodiment shown, as a function of time t.

Figure 4:
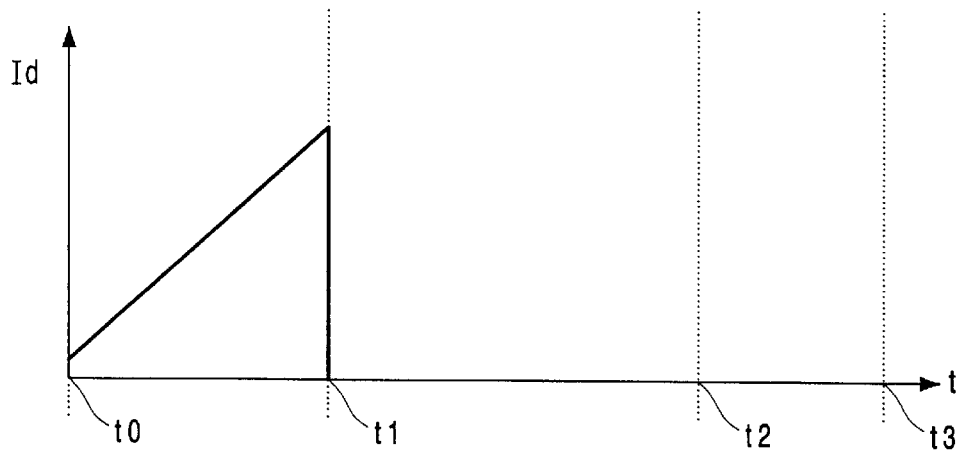

FIG. 4 graphically depicts the gradient of the current Id through the series arrangement formed by the primary winding 3, the switching transistor T, and the current sensing resistor Rs as a function of time t.

It is assumed that the switching transistor T is switched on at moment t0 via the start circuit through the application of a DC voltage to the DC input connection terminals 6 and 7 of the conversion circuit 1. Switching-on of the switching transistor T has the result that a current Id starts flowing through the primary winding 3 of the transistor 2, which current increases gradually in proportion as more energy is stored in the transformer 2, see FIG. 4. The voltage across the current sensing resistor Rs also increases, i.e. proportionally to the increase in the current Id. The voltage in the auxiliary winding 5 of the transformer is positive (with respect to signal ground), which results in a forward coupling at the gate of the switching transistor T, so that the voltage Vg at the gate of the switching transistor T remains substantially the same. Since the gate-source voltage of the switching transistor T is dimensioned above the threshold voltage of the switching transistor T, the transistor T will enter the saturated state, see FIG. 3. The drain-source voltage Vds across the switching transistor T is substantially zero then, see FIG. 2.

The control transistor Q will discharge the capacitor C1 and the gate-source capacitance of the switching transistor T when the voltage across the current sensing resistor Rs reaches a value at which the base-emitter voltage of the control transistor Q is sufficiently high for making the latter conducting, i.e. at the moment t1, which results in switching-off of the switching transistor T. In the embodiment of the conversion circuit 1 under discussion here, the switching transistor T is switched at the peak value of the current Id.

The energy stored in the transformer 2 at moment t1 will be supplied to a load (not shown) connected to the DC output connection terminals 9 and 10 owing to the fact that the diode D3 becomes conducting. At moment t2, the current through the diode D3 is reduced to zero. Both the switching transistor T and the diode D3 are therefore non-conducting from this moment. An oscillation arises as a result of the primary inductance and the total drain-source capacitance of the transformer 2 and the switching transistor T, respectively, so that an AC voltage positive with respect to the signal ground is induced in the auxiliary winding 5 of the transformer 2. This voltage is also offered to the control electrode, i.e. the gate of the switching transistor T, see FIG. 3, via the series arrangement of the resistor R2 and the capacitor C2.

The diode D2 of the voltage control circuit 8 now becomes conducting, so that a negative voltage is built up across the capacitor Ca of the voltage control circuit 8, i.e. negative with respect to the signal ground. This negative voltage may be utilized in combination with the optical coupling member OC for reducing the emitter voltage of the control transistor Q, which will result in a lower primary peak current because the base-emitter voltage for switching the control transistor Q on is reduced thereby. The output voltage at the DC output connection terminals 9 and 10 can thus be regulated.

The circuit is optimally dimensioned, inter alia through a suitable choice of the winding ratios of the transformer windings and the various electronic components, such that the first maximum of the voltage thus generated in the auxiliary winding 5 at moment t3 lies sufficiently above the threshold voltage of the switching transistor T for a renewed switching-on thereof at an average to high output power as compared with the nominal power of the conversion circuit 1. Since the voltage in the auxiliary winding 5 is the inverse of that of the primary winding 3, owing to the winding or connection mode, the voltage Vds across the transistor T is at a minimum when the latter is switched on, see FIG. 2, so that the switching losses across the switching transistor T are a minimum upon switching-on. The cycle then repeats itself starting from the moment to.

At comparatively low output powers, i.e. low as compared with the nominal power of the conversion circuit 1, the switching frequency of the switching transistor T is reduced according to the invention so as to prevent an undesirable increase in the switching losses accompanying a falling output load. This is illustrated in the idealized waveforms in the graphs of FIGS. 5 to 7.

Figure 5:
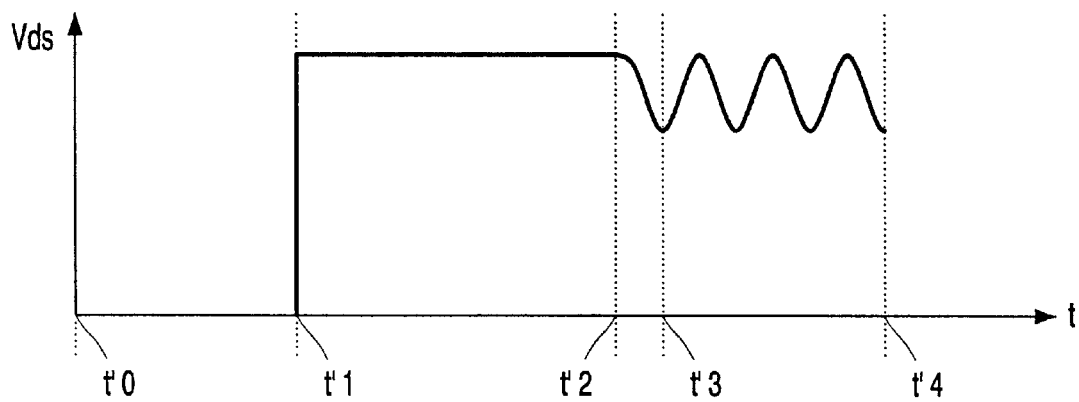

FIG. 5 graphically depicts the gradient of the drain-source voltage Vds across the switching transistor T as a function of time t again.

Figure 6:
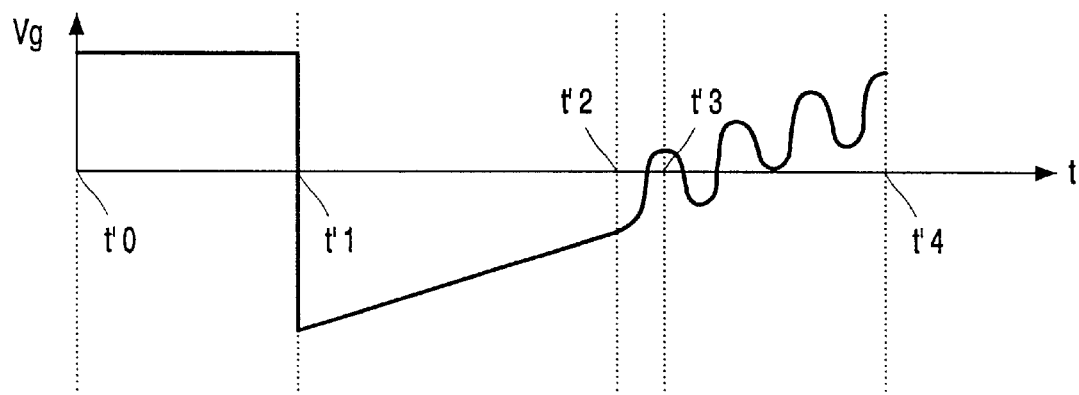

FIG. 6 graphically depicts the gradient of the voltage at the control electrode, i.e. the gate Vg of the switching transistor T as a function of time t again.

Figure 7:
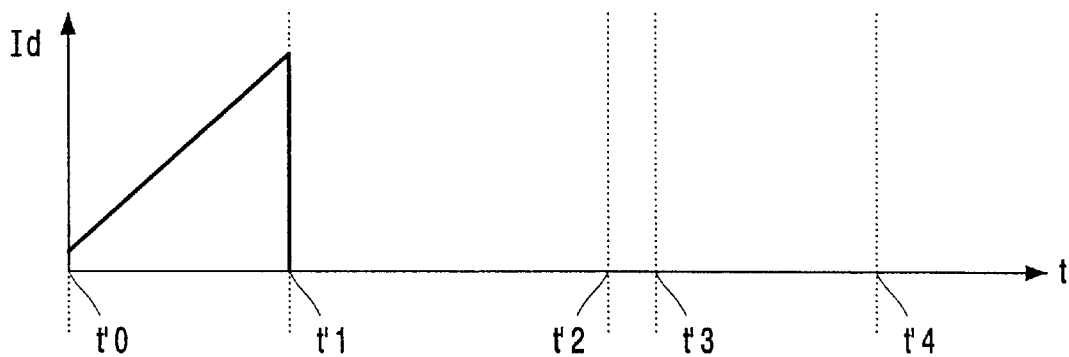

FIG. 7 graphically depicts the current Id through the series circuit of the secondary winding 4, the switching transistor T, and the current sensing resistor Rs as a function of time t again.

It is noted that the time scale of FIGS. 5, 6, and 7 is compressed as compared with the time scale of FIGS. 2, 3, and 4.

It is assumed that the switching transistor T is switched on at moment t'0, which will result in an increasing current Id again, as shown in FIG. 7.

The rise of the voltage across the current sensing resistor Rs will cause the control transistor Q to become conducting at moment t'1, so that the switching transistor T is switched off, as discussed above. Since a comparatively low output load is presupposed, a smaller charge is now stored in the gate capacitance of the switching transistor T via the auxiliary winding 5, which results in a lower gate voltage Vg, as shown in FIG. 6, as compared with the situation with a comparatively high output load as shown in FIG. 4. During the period in which the diode D3 is conducting from the moment t'1, i.e. during the supply of power to the DC output connection terminals 9 and 10, the gate voltage of the switching transistor T will rise slightly via the auxiliary winding 5. The total gate voltage, however, will remain below the threshold voltage of the switching transistor T. Oscillation will arise again starting from the moment t'2, as described above.

The total capacitive load on the control electrode, i.e. the gate of the switching transistor T, which in the circuit diagram of FIG. 1 is formed by the capacitors C1, C2 and the gate-source capacitance of the switching transistor T itself, is now adjusted according to the invention such that a sufficiently high voltage for switching the transistor T on is not built up on the control electrode, i.e. the gate, of this transistor T until after a few oscillations. As is clearly illustrated in FIGS. 5 and 6, the gate voltage Vg is still insufficient for switching on the switching transistor T at moment t'3, i.e. at the first maximum of the sinusoidal oscillation. Switching only takes place at the next maximum, at moment t'4.

The capacitive load applied to the control electrode, i.e. the gate, of the switching transistor T causes the gate voltage Vg to increase by an exponential component, while the drain-source voltage Vds across the switching transistor T oscillates between a minimum and a maximum value, as shown in FIG. 5. Given an optimum dimensioning, switching-on of the switching transistor T takes place at or adjacent a minimum of the drain-source voltage also in this case, so that again the switching losses will be as small as possible.

The delayed switching-on of the transistor T as explained above automatically and gradually reduces the switching frequency in dependence on the degree of output loading, so that the risk of excessive switching losses in the switching transistor T in a SOPS resulting from the automatic rise in the switching frequency accompanying the reduction in the output power at the output connection terminals 9 and 10 is effectively prevented by the invention.

Since the switching frequency is varied gradually, the output power of the conversion circuit 1 can be effectively controlled via the voltage control circuit 8 also in the case of comparatively low values.

It will be clear to those skilled in the art that a bipolar transistor or a different field effect transistor may be used instead of a MOST as the switching transistor T. Furthermore, the transformer 2 may be constructed as a single coil, and the conversion circuit may be simply implemented with discrete components, or alternatively as an integrated circuit.

The control transistor Q can be biased, through a suitable choice of the capacitor Ce and the resistor Re and through a suitable control of the optical coupling member OC, such that the transistor Q enters the conductive state at a comparatively low voltage across the current sensing resistor Rs already, which will result in a lower output power at the output connection terminals 9 and 10 of the conversion circuit 1. The output voltage, i.e. the output power supplied by the conversion circuit, may accordingly be dynamically varied through a variation in the bias voltage.

What is claimed is:

1. A DC/DC conversion circuit (1) comprising a transformer (2) with a primary winding (3), a secondary winding (4), and an auxiliary winding (5); a switching transistor (T) which forms a series circuit with the primary winding (3) between first and second DC voltage input connection terminals (6; 7); a start circuit (R1, C1) which is connected to a control electrode of the switching transistor (T) for switching on the latter when the DC voltage input connection terminals (6; 7) are powered; a control transistor (Q) connected to the control electrode of the switching transistor (T) for switching off the switching transistor (T) in dependence on a current flowing in said series circuit during operation; and a voltage control circuit (8) connected to the auxiliary winding (5) and the control transistor (Q) for controlling an output power supplied at the secondary winding (4) of the transformer (2) during operation through switching-on of the switching transistor (T) in a controlled manner in dependence on the value of a current flowing in the primary winding (3), characterized in that the conversion circuit (1) is designed such that during operation a voltage required for switching the switching transistor (T) on is built up on the control electrode thereof in a time period whose length is inversely proportional to the value of the output power supplied to the secondary winding.

2. A conversion circuit (1) as claimed in claim 1, characterized in that the control electrode of the switching transistor (T) is capacitively loaded by means of at least one element with a capacitive action such that the voltage required for switching-on of the switching transistor (T) is built up in said element during operation.

3. A conversion circuit (1) as claimed in claim 2, characterized in that said at least one element with capacitive action is formed by a capacitor (C1) which is connected to the control electrode of the switching transistor (T) and which forms part of the start circuit (R1, C1), a coupling capacitor (C2) by which the voltage control circuit (8) is connected to the control electrode of the switching transistor (T), and the inherent gate-source capacitance of the switching transistor (T) itself.

4. A conversion circuit (1) as claimed in claim 2 or 3, characterized in that the at least one element with capacitive action and the voltage control circuit (8) are dimensioned such that the switching transistor (T) switches itself on during operation at or adjacent a maximum in the voltage of the auxiliary winding (5) which corresponds to a minimum in an oscillation voltage induced in the primary winding (3) of the transformer (2).

5. A conversion circuit (1) as claimed in claim 1 or 2, characterized in that the voltage control circuit (8) comprises a rectifier circuit (D2, R3, Ca, Ra) connected in parallel with the auxiliary winding (5) for applying a bias voltage to the control transistor (Q) during operation.

6. A conversion circuit (1) as claimed in claim 5, characterized by an optical coupling circuit (OC) coupled to the control transistor (Q) and to the rectifier circuit (D2, R3, Ca, Ra) for influencing the bias voltage applied to the switching transistor (T) by the rectifier circuit (D2, R3, Ca, Ra) during operation.

7. A conversion circuit (1) as claimed in claim 1 or 2, characterized in that at least the primary (3) and the secondary (4) windings of the transformer (2) are formed by a single winding with suitable taps.

* * * * *